Sept. 28, 1965  G. F. HILL  3,208,270
VIBRATION TESTING SLIP TABLE
Filed June 27, 1961
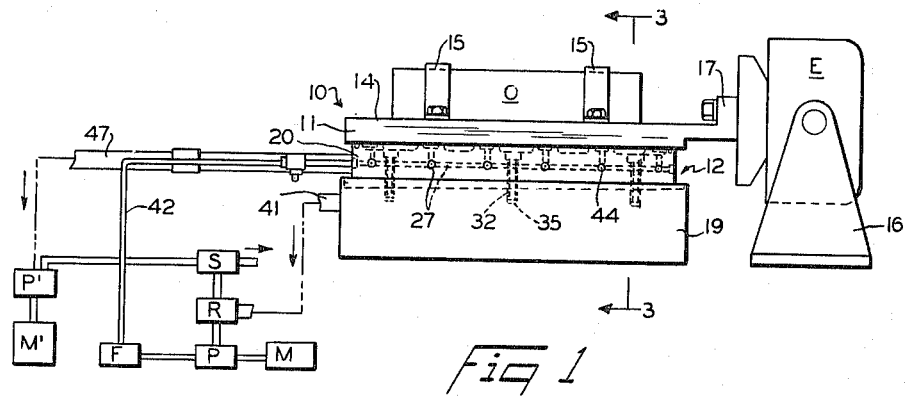
INVENTOR.
GILBERT F. HILL United States Patent Office 3,208,270
Patented Sept. 28, 1965

3,208,270
VIBRATION TESTING SLIP TABLE
Gilbert F. Hill, Skaneateles, N.Y., assignor to L.A.B. Corporation, Skaneateles, N.Y., a corporation of New Jersey
Filed June 27, 1961, Ser. No. 119,989
8 Claims. (Cl. 73—71.6)

This invention relates to a fluid supported slip table peculiarly adapted for high frequency vibration testing. More specifically, it relates to a movable table employing hydrostatic bearings for supporting heavy loads with very low frictional resistance to movement, and further employing elastic fluid means for resisting the reaction forces concomitant with direction reversal and rapid acceleration to prevent tilting or deflection.

Heretofore such tables have employed sliding surfaces or rolling elements in supporting the weight of the object tested, and have employed conventional ways and slides for guiding the movable table in its path. Such means are objectionable as setting up frictional resistances to the vibrational forces applied to the table. The frictional resistance makes it difficult to accurately control velocity or amplitude of vibration. Conventional sliding and rolling elements are noisy, and set up other unwanted vibrations. Moreover, conventional guide means must have objectionable freedom or play in a direction perpendicular to the path of motion to avoid unworkable levels of friction.

Some experiments have heretofore been made to support a slip table having a flat under surface upon another flat surface separated one from the other by a film of oil. Such slip tables have been found to be unfiit, however, to support loads of substantial weight or for a length of time adequate for any true testing.

The principal object of the invention, accordingly, is to provide a movable table for supporting relatively heavy loads for straight line motion in a horizontal plane, with the least possible friction, and with the least possible deflection of the table in a direction perpendicular to the path of motion.

A further object is to provide a testing table for high frequency vibration testing which will resist tilting of the table in a vertical plane resulting from rapid reversal of motion and high acceleration, and will resist deflection of the table from side to side due to misalignment of the thrust of the vibration inducing means with the center of gravity of the object tested or due to off-center loading of the table.

Another object is to provide a low-friction table on which a heavy test object may be resiliently supported with the minimum of possible vertical displacement and in which aberrant force couples set up by vibrational test forces and reaction forces are resisted by a highly elastic hold-down force capable of providing a restoring force of great magnitude.

Another object is to provide a tilt-resisting, low-friction table on which a relatively heavy test object may be supported independently of the vibration inducing means.

Still further objects and advantages will become apparent from the following description taken in conjunction with the accompanying drawing, in which:

FIGURE 1 is a side elevational view of a preferred embodiment of the invention, conventional portions of the machine being diagrammatically shown;

FIGURE 2 is a fragmentary exploded perspective view thereof;

FIGURE 3 is a transverse sectional view thereof; on a smaller scale, on the line 3—3 of FIGURE 1; and FIGURE 4 is an enlarged fragmentary sectional view on the line 4—4 of FIGURE 2.

In the drawing, the slip table 10 comprises a table portion 11 and a base portion 12. The table portion 11 consists of a flat movable plate member 14 having a smooth and flat undersurface and is provided with tapped holes 13 in the usual manner for securing thereon, as by clamps 15, an article O to be tested.

A vibration producing means or exciter, shown diagrammatically at E, such as an electromagnetic oscillator or a reaction type vibrator powered by an unbalanced rotating weight, is supported on a standard 16. A projecting portion 17 of the table or a separate connecting member secured to the table is secured by bolts or other means to the exciter E.

The base portion 12 has a support member 19, and a base or bearing member 20, made in two like parts 20′ and 20″ as shown in FIGURE 2. Each rectangular part 20′ and 20″ of the bearing member 20 has an upper surface the major portion of which is relieved as indicated at 21 leaving the raised land portions 22 and 23 having upper surfaces in a common plane above the relieved portion.

The lands 22, which may be termed pressure lands, each define a circular hydrostatic bearing area having the usual recess or pressure pocket 25, best seen at FIGURE 4, and the bearing areas are evenly distributed over the upper surface of member 20. Each pressure pocket 25 has a downwardly bored passage 26 leading to longitudinally and transversely bored oil conduit passages 27 so that all of the pressure pockets are interconnected. Each passage 26 has a plug 28, with a restricted bore 29 therethrough, threadedly secured in the passage for providing the restriction necessary to obtain the required pressure differential for this type of hydrostatic bearing as is well known in the art.

The lands 22 which are adjacent the three outside edges of the bearing members 20′ and 20″ are connected by the perimetrical land 23 for sealing the relieved portions 21 from atmospheric pressure, as will hereinafter appear.

The side walls adjacent the fourth side of the parts 20′ and 20″, which face each other in FIGURE 2, are also provided each with a plurality of like hydrostatic bearing areas, including lands 22 and pressure pockets 25 communicating in like manner with the passages 27. A sealing land 23 connects the pressure lands 22 along the end and bottom edges of these side walls as best seen in FIGURE 2.

The moveable table member 14 is provided with a depending, rectilinear, flat-sided keel element 30 bolted at 31 (FIG. 2) to the under surface thereof. The bearing member parts 20′ and 20″ are bolted by means of bolts 32 (FIG. 1) to the support member 19 in spaced apart relation so as to provide a way 33 therebetween for the keel 30, about one-thousandth of an inch clearance for the keel being provided.

Each bolt 32 passes through one of a plurality of evenly spaced shouldered holes 34 provided in the parts 20′ and 20″, and into registering tapped holes 35 in support member 19 (FIG. 2). Thus the parts 20′ and 20″, when secured in place, constitute, in effect, a single bearing member 20 in base 12, having the way 33 longitudinally disposed therein, and having a plurality of evenly spaced hydrostatic bearing areas distributed over the upper surface thereof and along both sides of the way 33.

The table member 14 overlies the bearing member 20, when both parts 20′ and 20″ are secured in place, and is preferably slightly larger. The support member 19 is slightly larger than table member 14 and may be provided with an upstanding guard strip 38 secured around the edges thereof as shown in FIG. 3 only. A drain groove 39 is provided in the upper surface of support member 19 about the member 20, which groove is sloped toward a threaded drain hole 40 in the side thereof for collecting such pressure fluid as may seep out from over the sealing lands 23.

A drain line 41 from the hole 40 is provided, leading to an oil reservoir R. Oil or other fluid may be pumped under pressure by pump P, powered by motor M, through a filter F and thence through the pressure line or conduit 42, through suitable fixtures, to a threaded hole 43 at one end of one of the interconnected passages 27 in each of the parts 20′ and 20″ of member 20. It will be understood that the outer ends of other passages 27 are provided with plugs 44.

Each of the parts 20′ and 20″ are provided with an L-shaped passage 45 bored downward from relieved portion 21 of the upper surface of these parts and longitudinally inward from the threaded hole 46 for connecting the hole 46 with the negative pressure space bounded by the relieved area of the upper surface of the base, the bottom surface of table 14, and the sealing lands 23. Holes 46 are connected, through suitable fittings, to a line 47 leading to a vacuum pump P′ powered by a motor M′, for providing a partial vacuum or negative pressure in the above described space, the term "negative pressure" as used herein meaning a pressure that is less than atmospheric pressure. Oil exhausted by the pump P′ may be returned through a separator S to the oil reservoir R.

A shallow sealing groove 49 may be provided in the upper surface of sealing land 23 about the three sides of each of the parts 20′ and 20″ of the bearing member 20 for a purpose which will become apparent.

The operation of the slip table 10 will now be described. Oil, or other hydraulic fluid, is pumped under pressure to the interconnected supply passages 27. From the passages 27 the fluid reaches each pressure pocket 25 normally at the pressure maintained by pump P through the passages 26 restricted by the bore 29 in each plug 28.

As the pressure in each pocket 25 rises, the table 14 is lifted slightly away from the lands 22 and 23, each hydrostatic bearing area becoming a pressure pad for supporting the table. The pressure fluid escapes slowly over the lands 22 because of the slight separation of plate member 14 and the lands and may be returned through the pump P′ to the reservoir R. As the table is vibrated by the exciter E, it is supported by a cushion of oil and does not come in contact with either the lands 22 or the lands 23.

At the same time, table 14 is held down close to the lands 22 and on the pressure pads by the suction maintained by the pump P′ and exerted under the major portion of the table. Preferably, a vacuum relative to atmosphere of about 10 to 20 inches of mercury is maintained. Oil pressure in each of the hydrostatic bearing areas is maintained at a normal of about 100 to 200 pounds per square inch. This results in a separation between table and base of the order of less than one-thousandth of an inch.

A slight outward seepage of oil, or other pressure fluid, over the lands 23 adjacent pressure pads 22 adjoining the perimeter of bearing member 20 may be collected in the drain groove 39 and led to the drain line 41, connected to drain hole 40, and led thence to the reservoir R.

To provide a supply of oil between lands 23 and plate member 14, the sealing groove 49 conducts a portion of this outwardly seeping fluid to the portions of the lands 23 between pressure lands 22. By providing a film of oil between pressure lands 23 and the plate member 14 a more efficient seal is provided lessening the work required of the pump P′.

As table 14 is vibrated, tilting of the table, caused by the inertial and acceleration forces and the resulting reaction forces, is resisted by the action of the hydrostatic bearings in a manner known to those skilled in the art. As table 14 tends to tip to the left, as viewed in FIGURE 1, for example, separation of the table from lands 22 at the right end of the table tends to increase, resulting in an increase escape of pressure fluid at this end of the table. As the fluid escapes, a lowering of the pressure in the pockets 25 in this region, due to the restriction in the passages 26, tends to lower this end of the table. Similarly, tilting of the table increases the pressure in the pockets 25 at the left end of the table by lessening the gap between table and lands 22 in this region and the consequent lessening of the escape of pressure fluid from these pockets. This leveling action is augmented by downward atmospheric pressure on table 14, caused by the partial vacuum under the major portion of the table.

It will be understood that, in the testing of objects O of considerable weight, the center of gravity of the object is necessarily relatively high above the plate member 14. As the vibrational forces are applied substantially at the level of the plate member 14, the resulting reaction forces form therewith a couple of a large magnitude which causes the tilting already referred to each time the table changes direction.

The force of atmospheric pressure is exerted downward against the plate member 14 by reason of the negative pressure, or vacuum, under the plate member. Assuming a symmetrical load, this downwardly directed pressure is exerted evenly over the whole upper surface and has the effect of a downward force, applied through the center of gravity of the system, and adding substantially to the weight of the system. The vacuum thus causes an increase in the effective weight of the system which in turn increases its resistance to tilting, the great advantage of the vacuum being that it can accomplish this result without increasing the mass, inertia or raising the center of gravity of the system.

The lifting pressure exerted by the fluid in the pressure pads is also a resilient pressure, although never resulting in an upward displacement of the plate member of more than very slight magnitude, normal separation between plate 14 and bearing member 20 being of the order of one-half of one-thousandth of an inch. Since the downward atmospheric pressure is also resilient, the resulting suspension of plate member 14 between two resilient forces imparts a capability for substantially friction-free movement of the plate member 14 over small distances which is also admirably adapted for low frequency testing, regardless of the weight of the object tested, where smoothness and precision of movement is necessary.

For accuracy and control of the plate member 14 in horizontal lineal testing, the table portion 11 of the slip table is guided by the keel member 30 in the way 33, and side to side deflection or twisting is resisted. The hydrostatic pressure on each side of the keel 30 is normally the same and the keel is separated from the way by a cushion or pressure pad of fluid provided by the pressure pockets 25 in the side walls of way 33. Any twisting or side to side deflection is resisted by an increased flow of pressure fluid where the gap between keel and lands 22 increases, and a build-up in pressure where the gap between the keel and lands 22 decreases.

It will now be apparent that there is provided a novel application of a known type of hydrostatic bearing, in combination with an elastic vacuum hold-down means, for use in a floating or slip table device, which is peculiarly adapted for high frequency vibration testing machines, or for low frequency testing machines where smoothness and precision of motion is required.

As will be understood by those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A tilt resisting, low friction table comprising: a base having a plurality of hydrostatic bearing areas each defined by a raised narrow pressure land on the upper surface of said base, the major portion of said upper surface being relieved and having a narrow perimetrical sealing land therearound; a table having a flat under surface overlying said base; a source of vacuum operatively connected to the space defined by the under surface of said table, the relieved major portion of said base upper surface, and said sealing lands; and means for supplying fluid under pressure to said hydrostatic bearing areas, including a restricted passage leading to each area defined by said pressure lands, the total possible effective pressure at said bearing areas being greater than the total effective vacuum pressure on said table; whereby said table is supported by fluid in said hydrostatic bearing areas and held down by said vacuum for automatically resisting tilting movement thereof.

2. A slip table for vibration testing, comprising a base member having the major area of its upper surface relieved between a plurality of separated hydrostatic bearing areas, said bearing areas being evenly distributed over said upper surface and each having a narrow land portion defining said bearing area, a pressure pocket defined by each land portion, a narrow perimetrical sealing land around the edges of said upper surface, all of said lands having smooth upper surfaces in a common plane, means for supplying liquid lubricant under a constant pressure to the pressure pockets of said bearing areas, interconnected passages in said base connecting said pressure pockets with said supply means including a constricted pasage leading to each pressure pocket, a constant source of vacuum connected to the relieved major area of said upper surface, and a movable table member having a flat under surface overlying said base member.

3. The slip table of claim 2 having a longitudinally extending keel element secured to the under surface of said table member, said base member having a complementary way therein, and additional separated hydrostatic bearing areas having lands whose outer surfaces lie in a common plane narrowly spaced from the sides of said keel element, each additional bearing area being connected by means including a restricted passage to said means for supplying lubricant under pressure.

4. The slip table of claim 3 having means for collecting lubricant passed between said table member and said perimetrical land and between said keel and said way, said collecting means being exterior of said perimetrical lands, separator means for collecting lubricant from said vacuum source, and means for returning lubricant from said collecting means and separator means to said lubricant supply means.

5. A tilt resisting, low friction table for high frequency vibration testing comprising a movable table member having a flat under surface, a longitudinally extending keel element secured pendantly to said under surface, means for securing an object to be tested to said table member, a pair of hydrostatic bearing members underlying said table member in spaced apart relation on either side of asid keel element thereby providing a way therefor, a support member for providing means to which said bearing members are levelly secured, said bearing members having a plurality of depressed areas evenly distributed over the upper surface thereof, each of said areas having a narrow land therearound, a narrow perimetrical land at the three outside edges of each bearing member, a plurality of pressure areas and lands on the side of each bearing member adjacent said keel element, means for supplying liquid lubricant under pressure to each pressure area including interconnected passages in said bearing members and restricted passages leading to each pressure area, a source of vacuum, conduit means connecting said vacuum source with the area between said pressure containing lands, said last-named area being substantially greater than the total of said pressure areas, and collecting means on said support member for collecting ejected lubricant for reuse.

6. A slip table, comprising: a movable table member having a smooth, flat under surface; a pendant, flat-sided keel element secured to said under surface; a base member; a pair of hydrostatic bearing members, levelly secured to said base member, underlying said table member in spaced apart relation on either side of said keel element for providing a way therefor; the upper surface of each bearing member and its side adjacent said keel element having a relieved portion extending over a major part thereof and a plurality of small pressure pockets evenly distributed thereover, each pressure pocket being defined by a narrow pressure land therearound; a narrow perimetrical sealing land on the upper surface of each bearing member extending around the three outside edges of the member; means for supplying liquid under pressure to said pressure pockets including a restricted passage leading to each pocket; and a source of vacuum connected to the space defined by the relieved portion of the upper surface of said bearing members, the under surface of said table member, and said sealing lands.

7. The combination, with a slip table and a supporting base, of hydrostatic bearing areas and negative pressure areas in the support surface of said base for resisting tilting of the table during irregular horizontal motion of the table on the base, said bearing areas each being defined by a pressure land and a depressed area surrounded by the land, a source of fluid under pressure, conduit means including a restricted orifice for each area for supplying fluid under pressure to said bearing areas, said negative pressure areas being relieved portions of said supporting base surrounded by a perimetrical land and separated from said bearing areas by said pressure lands, and a source of negative pressure, said negative pressure areas being distributed over the major portion of said support surface and being connected to said negative pressure source, the negative and fluid pressures and the bearing and negative pressure areas being so proportioned that the total negative pressure effective on said table is always less than the maximum possible fluid pressure effective thereon, and said restricted orifices being dimensioned to continually maintain the total fluid pressure effective on said table equal to the total negative pressure and the weight of the table and test load.

8. A vibration testing slip table comprising in combination a flat table member and a base for slidably supporting the table member in a horizontal, level position, said base having means to apply a vacuum to at least 50% of the underside of said table member to produce a large hold-down force exerted effectively at the center of gravity of the member, said base also having a plurality of widely distributed hydrostatic bearing elements extending to the perimeter of said table member for a long supporting baseline, each of said bearing elements having its pressure area sharply defined by a narrow land that encircles the area.

References Cited by the Examiner

UNITED STATES PATENTS

| 2,049,343 | 7/36 | Warren | 308—9 |
| 2,411,391 | 11/46 | Robaczynsky | 308—5 |
| 2,695,198 | 11/54 | Brugger | 308—9 |
| 2,771,948 | 11/56 | Thumin | 308—5 |
| 2,862,385 | 12/58 | Woods | 73—71.6 |
| 2,869,933 | 1/59 | Bissinger | 308—5 |
| 2,885,915 | 5/59 | Schurger | 77—64 |

OTHER REFERENCES

Instruments and control systems, pages 240–245, February 1960 issue, article by Alvin B. Kaufman, "Acceleration Generator."

RICHARD C. QUIESSER, *Primary Examiner.*

ROBERT EVANS, DAVID SCHONBERG, *Examiners.*